Oct. 17, 1933.　　　　A. W. MORTON　　　　1,930,857
METHOD OF MAKING PISTON RING JOINTS
Filed Nov. 10, 1932　　　　2 Sheets-Sheet 1
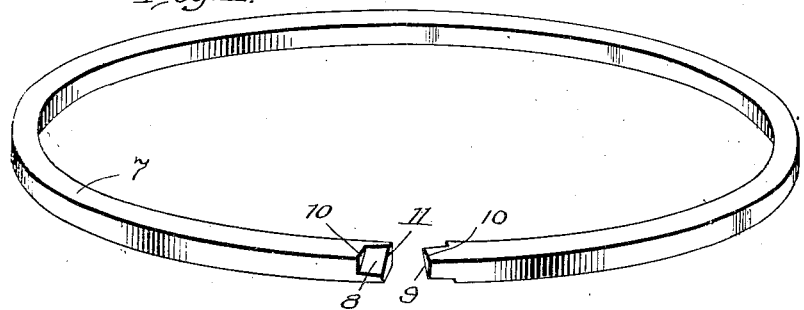
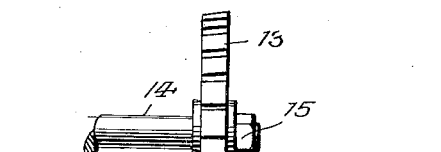
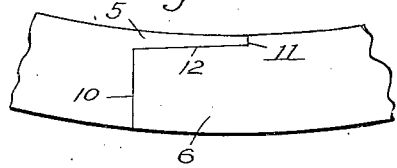
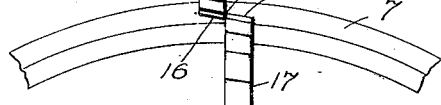
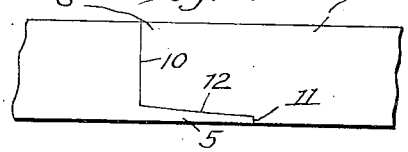
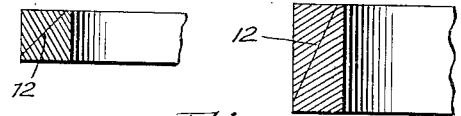
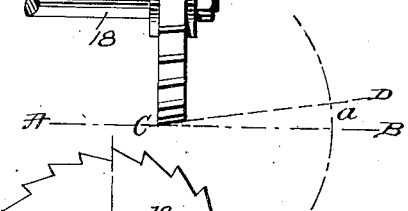
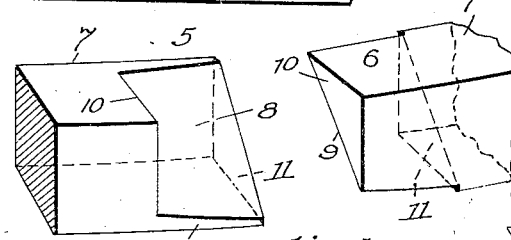
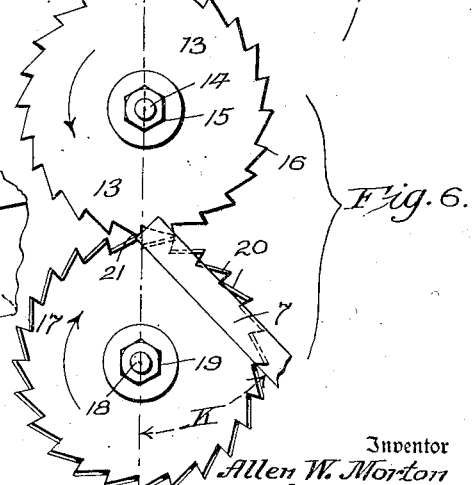
Inventor
Allen W. Morton
By
Attorneys

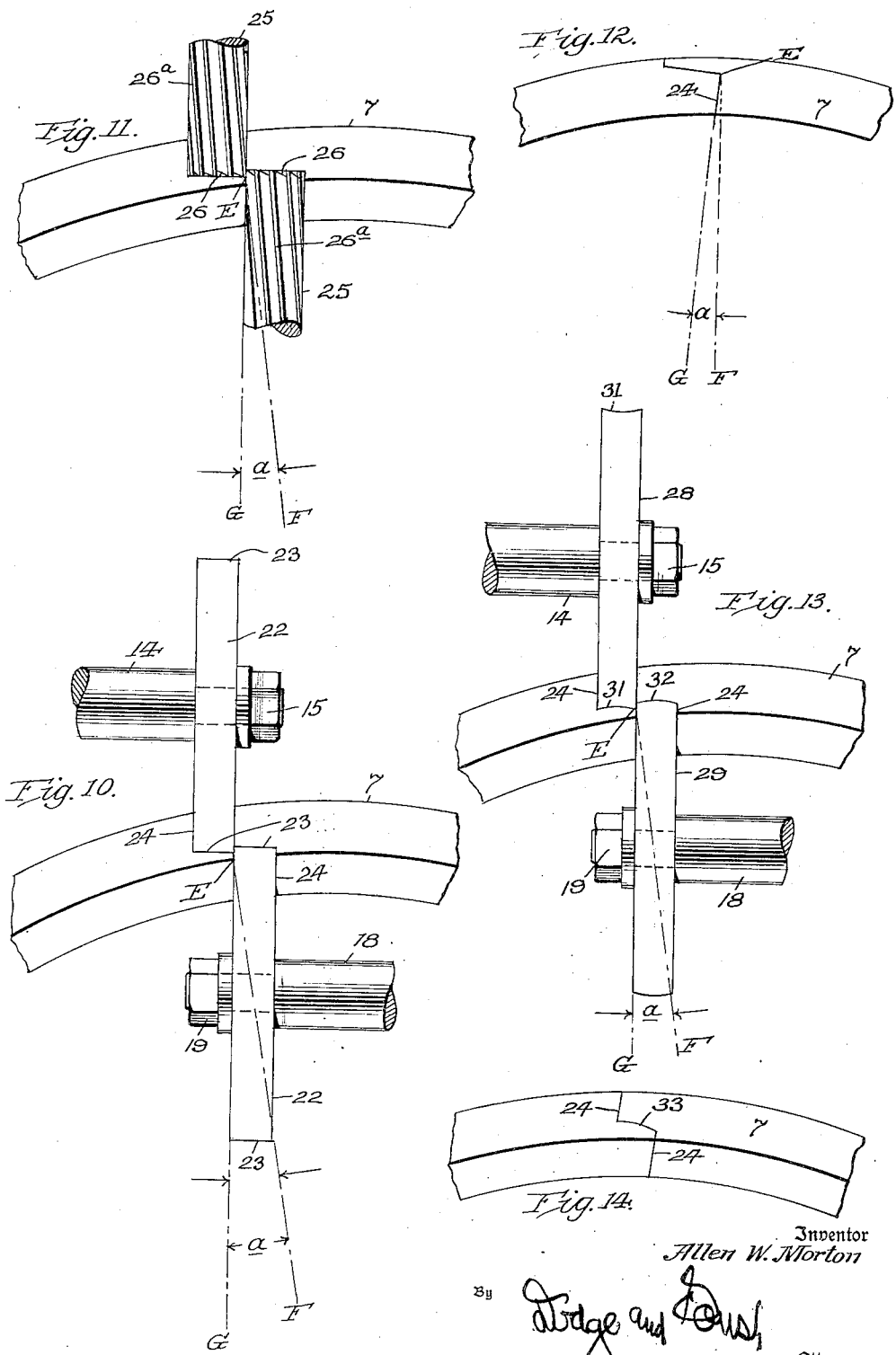

Patented Oct. 17, 1933

1,930,857

UNITED STATES PATENT OFFICE 1,930,857

METHOD OF MAKING PISTON RING JOINTS

Allen W. Morton, Baltimore, Md., assignor to The American Hammered Piston Ring Company, Baltimore, Md., a corporation of Maryland Application November 10, 1932
Serial No. 642,083

6 Claims. (Cl. 29—156.62)

My invention relates to piston rings and particularly to a method of forming the joints in such rings, and is a continuation in part of my application Serial No. 440,759, filed April 1, 1930, entitled Method of making piston rings, which application is a division of application Serial No. 398,983, filed October 11, 1929 now Patent No. 1,756,905 of April 29, 1930.

Piston ring joints of the stepped type are known, and it is also known in the art to cut the steps diagonally. A joint of the latter type is shown in the United States patent to J. S. Raworth, No. 615,902, granted December 13, 1898, the joint being formed by two radial cuts connected by a conical cut. In making joints of this type, it is necessary to use milling cutters having their cutting faces of such a radius that the contacting surfaces of the steps are arc-shaped and have the same radius of curvature as that of the cylinder in which the ring is to be used. Such a construction produces a tight seal even when the cylinder and ring become worn, because as the joint opens the surfaces of the steps remain parallel to each other, but it is necessary that a separate pair of milling cutters be provided for each size of ring. A method of forming joints of this character is disclosed in the United States patent to Dunham, No. 1,269,409, June 11, 1918. Cutters of the type disclosed in this patent are difficult and expensive to make, so that the cost of producing rings with joints of this character is prohibitive, although it is possible to carry out my method as hereinafter more fully set forth by the use of cutters of this type.

It has also been proposed to form the stepped surfaces plane with the legs straight throughout their extent, in order to make it possible to use one set of milling cutters for several ring sizes. This construction is not satisfactory because when the ring becomes worn or is placed in an oversize cylinder, a wedging action takes place, forcing one end of the ring away from the cylinder wall and causing excessive leakage. This result is due to the fact that as the ring joint opens, the surfaces of the steps do not remain parallel to each other, hence one of the steps is forced inwardly away from the cylinder wall.

I have found by experiment that a diagonally stepped joint having substantially all of the advantages of the Raworth construction can be made cheaply and easily by passing a closed ring between overlapped milling cutters having their cutting faces inclined with respect to their axes, so as to form plane stepped surfaces on the legs of the joint, these legs tapering toward their free ends so that one leg is pentagonal and the other triangular in cross section. The angle at which the cutters are inclined can be calculated from the dimensions of the ring.

This same type of joint can also be made by employing ordinary milling cutters and rotating the ring slightly in its own plane to produce the taper referred to. Still another manner of making this joint is to make use of end mills which are fed against the ring, the ring being rotated slightly in its own plane, as in using ordinary milling cutters, and continuing the cuts until they intersect to sever the ring. In each case, of course, the plane of the ring must be inclined with respect to a plane defined by the axes of the cutters.

In order to have the joint open on a line coinciding as nearly as possible with the arcuate line of opening of the Raworth joint, it is necessary that this taper be slight, and hence the angle of inclination of the cutter faces, or the angle through which the ring is rotated in its own plane, must be slight. For angles of the magnitude in question, the natural sines and tangents do not differ much in value, but to be strictly accurate I prefer to make this angle such that its natural sine is substantially equal to the ratio of the length of one of the legs of the joint to the ring diameter. When a ring joint is cut with the tapered legs embodying this mathematical relation, the joint will open freely with no wedging action, and yet the plane surfaces of the legs will maintain such accurate alignment that the sealing action is practically as effective as that which can be obtained with the much more expensive Raworth construction.

Although I have referred to the surface of the legs of the joints as being plane, broadly considered the joint may be produced by using cutters formed to generate complementary surfaces, whether such surfaces be straight or curved. In other words, the generatrix may be a straight line or a curved line. For practical purposes it is most often preferred to employ a straight line generatrix. It is, however, perfectly feasible to use a curved line generatrix and of this I have shown one example, and it is to be understood that the terms of the claims are meant to cover either form of generatrix, except where specific limitations have been included.

Several embodiments of my invention are shown in the accompanying drawings, in which:

Fig. 1 is a perspective view of a piston ring having a diagonally stepped joint made in accordance with my invention;

Fig. 2 is a top plan view of the ring joint as it appears in closed position;

Fig. 3 is a view in side elevation of the ring joint in closed position;

Fig. 4 is an enlarged perspective view of the ring joint;

Fig. 5 is an elevation of the cutters employed in forming a stepped joint in accordance with my invention, and showing a ring in the process of being cut;

Fig. 6 is a view in elevation taken from the right of Fig. 5, showing the angular relation of the ring to the cutters;

Figs. 7, 8 and 9 are sections taken through ring joints made in accordance with my invention and illustrating how the inclination of the meeting faces of the legs is varied according to the ring cross sections;

Fig. 10 is a view similar to Fig. 5, but showing the use of ordinary plain or face milling cutters and the ring rotated in its own plane to produce the tapered joint;

Fig. 11 is a perspective view of a ring in the process of having a joint cut by end mills;

Fig. 12 is a top plan view of a closed ring joint made by the use of end or face mills, as in Fig. 10 or 11;

Fig. 13 is a view similar to Fig. 10 but showing the faces of the milling cutters curved to produce a radiused joint; and Fig. 14 is a view of the closed joint after the completion of the operation shown in Fig. 13.

Similar reference characters refer to similar parts in each of the several views.

The reference character 7 designates a split piston ring of conventional type as employed in internal combustion engines, and having a stepped joint. This joint is made up of two legs 5 and 6 having plane cooperating surfaces 8 and 9 respectively, defined by radial or transverse cuts of substantial width, the sides of these cuts being designated 10 and 11, respectively. When the ring is contracted to fully close the joint, the surfaces 8 and 9 are in close contact, as shown in Figs. 2 and 3. The plane surfaces 8 and 9 are inclined in such manner as to trace a line on one plane face only of the ring, this line being inclined to the sides of the cuts and to the tangent to the periphery of the ring at the joint. These surfaces are, therefore, inclined to a radial plane of the ring passing through the ring joint. By the term "radial plane" is meant any plane coincident with a radius of the ring and passing through the axis of the ring perpendicular to the plane of the ring. Consequently a joint is produced having one leg pentagonal in cross section and the other triangular.

By making the joint in this manner, no knife edges are formed on leg 5, either on the plane faces of the ring or on the inner or outer circumference of the ring. Hence, when the complementary leg 6 overlaps leg 5, leaving a space between sides 10 and 11 of the cuts, blow-bys at the joint are prevented, because any fluid that enters between the sides 10 is prevented from escaping to the rear of the ring by the upper portion of leg 5, and is also prevented from escaping past the periphery by the lower portion of leg 5, as shown in the drawings.

By reference to Figs. 2 and 3, the inclined character of the cooperating surfaces 8 and 9 will be seen. The planes of contact of these surfaces are indicated in these figures by the reference character 12, and their angular positions are determined by the angle of inclination of the cutting faces of milling cutters 13 and 17.

One method of cutting the joint is indicated in Figs. 5 and 6. As shown in these figures, milling cutter 13 is secured on shaft 14 by a nut 15 and has its cutting surface 16 inclined at a small angle with respect to the axis of the cutter. In a like manner, the cutter 17 is secured to shaft 18 by nut 19 and has an inclined cutting surface 20. These cutters are placed in slightly overlapping relation at 21 with their cutting surfaces in substantially parallel relation at this point. The angle of inclination of the cutting faces is designated $a$, and is determined by the rato of the thickness of a cutter (the same as the length of a leg) to the diameter of the ring to be cut. If the line ACB designates the axis of the cutter 17, then the angle $a$ is determined by the inclination of line CD, and for average sized rings this angle is between 2° and 3°. The cutters 13 and 17 are rotated by any suitable means, not shown.

When a closed ring is to be cut to produce a diagonally stepped joint, the angle $a$ having first been determined by calculation, the ring 7 is tilted to the position shown in Fig. 6, and while being held at the desired angle by any suitable means is brought into contact with the rotating cutters 13 and 17.

The angle between the plane defined by the cutter axes and one plane of the ring is designated K and is determined by the ring cross section. The cutter 13 cuts a plane surface 8 bounded by a cut 10, the surface 8 being inclined by an amount determined by the inclination of cutting face 16. In like manner, the cutter 17 cuts a plane surface 9 bounded by a radial or transverse cut 11, the surface 9 having the same inclination as the cutting face 20 of the cutter 17. As the ring 7 is moved toward the cutters in a straight line relation, the cutting faces penetrate deeper and deeper until the two cuts intersect. After this milling operation is completed, the ring can be contracted until the surfaces 8 and 9 meet in the plane 12 as seen in Figs. 2 and 3. Tension can now be obtained in the ring by any of the well known methods, such as peening the inner circumference, or heat treating.

If this method of forming a joint is to be applied to a ring in which tension is obtained by cutting a piece from the ring, and then re-turning the ring to produce perfect circularity, the steps of manufacture may be carried out in the following manner. A piece is first cut from the closed ring, the section removed being of a circumferential length equal to the free gap desired between the extreme ends of the ring. The ring is then closed and inserted in a gauge until the ends touch, the gauge tilted to the proper inclination, and the joint is milled as before. The ring is then re-turned after the joint is formed.

With the steps cut in this manner, substantial surface contact will be maintained between the surfaces 8 and 9 for all conditions of the joint between the fully open and fully closed positions, and the gas leakage, as shown by actual tests, is reduced by amounts varying from 33 to 70 per cent below that which occurs with rings using other types of joints.

Figs. 7, 8 and 9 illustrate how the angle K at which the ring to be cut is inclined to the cutter axes is varied in accordance with the ring cross section. In Fig. 7 the plane of contact 12 of the surfaces of the legs is shown as inclined at an angle of approximately 45 degrees where the ring cross section is substantially square. Fig. 8 shows the plane 12 inclined steeply on a wide ring of very small radial thickness, and Fig. 9 shows it inclined slightly on a narrow ring of great radial thickness. Changes in the angle K are made correspondingly in the rings of other cross sections.

As pointed out above, ring joints embodying this invention may be made by the use of cutters having inclined faces, but an equally good result may be accomplished by using ordinary plain or face milling cutters and rotating the ring slightly in its own plane so that the cuts made are not radial, but merely transverse. This method of producing the ring joint is illustrated in Fig. 10 of the drawings, wherein the spindles 14 and 18 carry the milling cutters 22, secured thereon as by nuts 15 and 19, respectively, the cutting faces of these milling cutters being designated 23. For the sake of simplifying illustration, the teeth of these cutters have not been shown since they are of standard construction and do not form an essential part of this invention.

Before the ring 7 is brought into contact with these cutters in the manner shown in Fig. 6, it is rotated in its own plane through an angle $a$, which is determined by the ratio of the length of one leg of the joint to the ring diameter. If, for example, the line EF is a radius of the ring 7, then the line EG would represent the position of this radius before the ring was rotated through the angle $a$.

The cuts are made as in the forms of the invention previously described, but they are transverse instead of radial and the sides 24 of the finished cuts are, therefore, not included in radial planes of the ring. The finished joint is otherwise the same as that illustrated in Fig. 4 of the drawings.

Another simple method of producing a ring joint embodying this invention is shown in Fig. 11. The reference character 25 is applied to each of the end milling cutters. The cutting faces 26 are in right angular relation to the sides of the cutters. The side teeth 26a it will be observed are in inclined relation to the cutter axes. The cuts produced in the ring 7 by side teeth 26a as the cutters engage the ring are straight, and plane surfaces are formed on the two legs of the finished joint. As in Fig. 10, the line EF designates the radius of the ring after it is rotated for the milling operation, and the line EG designates the position of that radius before the ring has been rotated through the angle $a$ to commence the cutting operation. It will be obvious that, if desired, cutting faces 26 may be employed in forming the joint.

The two cuts are made by advancing the ring and the millers relatively until the complementary cuts intersect to sever the ring. Inasmuch as the cuts of the two millers are complementary, a tight seal will be maintained when the ring is closed if the amount of overlap of the cutters is slight, and furthermore a tight seal will be maintained regardless of the amount of overlap of the two legs of the joint.

In order to make it more clear just how the joint produced by the two methods illustrated in Figs. 10 and 11 appears, reference may be had to Fig. 12 of the drawings. In Fig. 12, the joint is shown as it appears in looking from above, and it will be noted that the side 24 of one of the cuts occupies the plane which makes an angle $a$ with the radial plane of the ring. In other words, the side 24 of the cut coincide with the line EG and EF is the radius.

As pointed out above, it is not essential in practicing this invention that the generatrix be a straight line since a straight line is merely a line of constant zero curvature. Consequently, other curvature may be given to the complementary faces of the milling cutters and an example of one such form which these cutters may take is shown in Fig. 13 of the drawings.

Referring now to Fig. 13, the reference character 7 designates the ring, as before. In operative relation to this ring are two milling cutters 28 and 29 carried on spindles 14 and 18, to which they are secured by nuts 15 and 19, respectively. The cutter 28 has a concave face 31 which is complementary to a convex face 32 on the cutter 29. Consequently, when overlapping cuts are made by these two cutters, the closed ring is severed and when allowed to close up under tension, the two complementary surfaces generated by the action of cutter faces 31 and 32 will produce an accurate fit and the finished product will appear as in Fig. 14.

In employing cutters with curved faces, the ring is rotated in its own plane through the angle $a$ and the line EF represents the position of a radius of the ring which would have coincided with EG before such rotation. As in Figs. 10 to 12, the sides 24 of the cuts are not radially related to the ring, but are inclined to the radial planes of the ring intersecting the joint. As shown in Fig. 14 of the drawings, the trace 33 of the overlapping surfaces of the two legs of the joint is a curved surface and the four emerging points or corners of the surface so generated define a plane which is diagonally related to the radial planes of the ring intersecting the ring joint.

This indicates that the form of joint shown in Fig. 14 is merely a variation of the forms previously described, in which the overlapping surfaces of the legs of the joint are all plane. In each example which has been shown, these overlapping surfaces are diagonally related to a radial plane of the ring intersecting the ring joint, and it is to be understood that where the expression "diagonally related" is used, it is meant to cover not only a joint where the contacting surfaces are plane, but also one in which they are curved. It will likewise be understood that in each of the examples given the angle $a$, through which the ring is rotated for the cutting operation, is that determined by the formula given below.

In stepped joints of ordinary construction, the ring is weakened at the intersection of the legs with the body of the ring so that there is a likelihood of the ring breaking at this point. This is true both of joints having straight legs and those having conical legs of the Raworth type. A stepped joint made in accordance with my invention is, however, stronger because the tapered legs form cantilever sections which are reinforced at the intersection of the legs with the body of the ring.

Not only does this method of making diagonally stepped joints render gas leakage materially less, but it also provides a simple and inexpensive way of producing a superior product. One set of milling cutters can be used for several ring sizes and a tight joint can be produced in any sized ring whatsoever by application of the formula:

$$a = \sin^{-1} \frac{\text{length of a leg}}{\text{ring diameter}}$$

to the taper of the cutters, or to the angle through which the ring is rotated in its own plane prior to the milling operation.

What is claimed is:

1. The method of making a diagonally stepped joint for a piston ring, which consists in causing relative engaging movement in right line relation between a closed ring and a pair of overlapping milling cutters having their axes substantially parallel and their cutting faces inclined to their axes, maintaining the plane of the ring in inclined relation to the plane defined by the axes of the cutters, and maintaining the engagement until the cuts made by the overlapping cutters intersect and sever the ring.

2. The method of making a diagonally stepped joint for a piston ring, which consists in causing relative engaging movement between a closed ring and a pair of overlapping milling cutters, the axes of which are substantially parallel, and the cutting faces of which are reversely inclined to a plane passing through both cutters in parallel relation to the cutter axes, maintaining the plane of the ring in inclined relation to a plane defined by the axes of the cutters, and maintaining the engagement until the cuts made by the overlapping cutters intersect and sever the ring.

3. The method of making a diagonally stepped joint for a piston ring, which consists in making two intersecting transverse cuts in a closed ring by causing relative engaging movement between a closed ring and a pair of milling cutters having complementary cutting faces so formed as to produce straight cuts inclined to a radial plane of the ring intersecting the ring joint, maintaining the plane of the ring in inclined relation to a plane defined by the axes of the cutters, and maintaining the engagement until the ring is severed, the cuts produced being of such a character that the overlapping faces of the two legs produced are plane and trace a straight line on one plane surface only of the ring.

4. The method of making a diagonally stepped joint for a piston ring, which consists in makng two cuts transversely of a closed ring by causing relative engaging movement between such ring and a pair of milling cutters formed to generate complementary surfaces and having their cutting faces diagonally related to a radial plane of the ring intersecting the ring joint, while maintaining the plane of the ring in inclined relation to a plane defined by the axes of the cutters, and continuing the engagement until the cuts intersect and sever the ring.

5. The method of making a diagonally stepped joint for a piston ring, which method consists in making two transverse cuts in a closed ring by causing relative engaging movement between the ring and a pair of end mills in non-radial relation to the ring, and maintaining the plane of the ring inclined with respect to a plane defined by the axes of the mills until the cuts intersect.

6. The method of making a diagonally stepped piston ring joint, which consists in causing relative engaging movement between a pair of milling cutters having parallel axes and a closed ring, while holding the ring with its plane inclined to a plane defined by the axes of the cutters and rotated to a non-radial position with respect to the cutters, and continuing the engagement until the two non-radial cuts made by the cutters intersect and sever the ring.

ALLEN W. MORTON.